(12) United States Patent
Kursar

(10) Patent No.: US 11,250,845 B2
(45) Date of Patent: Feb. 15, 2022

(54) VEHICLE VIRTUAL ASSISTANT SYSTEMS AND METHODS FOR PROCESSING A REQUEST FOR AN ITEM FROM A USER

(71) Applicant: Toyota Connected North America, Inc., Plano, TX (US)

(72) Inventor: Brian M. Kursar, Fairview, TX (US)

(73) Assignee: TOYOTA CONNECTED NORTH AMERICA, INC., Plano, TX (US)

( * ) Notice: Subject to any disclaimer, the term of this patent is extended or adjusted under 35 U.S.C. 154(b) by 188 days.

(21) Appl. No.: 16/122,489

(22) Filed: Sep. 5, 2018

(65) Prior Publication Data

US 2020/0075001 A1 Mar. 5, 2020

(51) Int. Cl.
*G10L 15/22* (2006.01)
*G10L 15/30* (2013.01)
*H04W 4/02* (2018.01)

(52) U.S. Cl.
CPC .............. *G10L 15/22* (2013.01); *G10L 15/30* (2013.01); *G10L 2015/223* (2013.01); *G10L 2015/228* (2013.01); *H04W 4/027* (2013.01)

(58) Field of Classification Search
CPC ......... G06Q 30/06; G10L 15/22; G10L 15/30; H04W 4/027
USPC ........................................................ 704/275
See application file for complete search history.

(56) References Cited

U.S. PATENT DOCUMENTS

| 8,123,130 | B2 | 2/2012 | Pentel | |
|---|---|---|---|---|
| 9,715,685 | B2 | 7/2017 | Berlin | |
| 10,769,712 | B1* | 9/2020 | Edwards | ............ G06Q 30/0635 |
| 2003/0187573 | A1* | 10/2003 | Agnew | .............. G01C 21/3492 |
| | | | | 701/414 |

(Continued)

FOREIGN PATENT DOCUMENTS

WO    WO-2016166708 A1 * 10/2016 ............. G06Q 30/02

OTHER PUBLICATIONS

R. E. Anderson, A. Poon, C. Lustig, W. Brunette, G. Borriello and B. E. Kolko, "Building a transportation information system using only GPS and basic SMS infrastructure," 2009 International Conference on Information and Communication Technologies and Development (ICTD), 2009, pp. 233-242, doi: 10.1109 (Year: 2009).*

(Continued)

*Primary Examiner* — Bharatkumar S Shah
(74) *Attorney, Agent, or Firm* — Dinsmore & Shohl LLP

(57) ABSTRACT

A virtual assistance system for a vehicle is provided. The virtual assistance system includes one or more processors, one or more memory modules communicatively coupled to the one or more processors, an input device communicatively coupled to the one or more processors, an output device communicatively coupled to the one or more processors, and machine readable instructions stored in the one or more memory modules. The virtual assistance system receives, through the input device, a request for an item from a user, retrieves a location of an entity associated the item, calculates an estimated arrival time when the vehicle will arrive at the location, compares the estimated arrival time (Continued)

with a predetermined time associated with the entity, and instructs the output device to generate a delivery prompt related to the item in response to comparing the estimated arrival time with the predetermined time.

14 Claims, 6 Drawing Sheets

(56) References Cited

U.S. PATENT DOCUMENTS

| | | | | |
|---|---|---|---|---|
| 2010/0114734 | A1* | 5/2010 | Giuli | G06Q 20/12 |
| | | | | 705/26.1 |
| 2014/0032341 | A1 | 1/2014 | Balasubramani | |
| 2015/0324936 | A1* | 11/2015 | Wilson | G06Q 50/12 |
| | | | | 705/15 |
| 2015/0356665 | A1* | 12/2015 | Colson | G06Q 30/0635 |
| | | | | 705/26.81 |
| 2016/0342972 | A1* | 11/2016 | Berlin | G06Q 30/00 |
| 2018/0204179 | A1* | 7/2018 | Zeng | G06Q 50/30 |

OTHER PUBLICATIONS

Dale Buss, "Domino's Creates 1st Fast-Food Ordering App for Ford's Sync," online article, Aug. 23, 2018. URL: https://www.forbes.com/sites/dalebuss/2014/01/07/dominos-creates-1st-fast-food-ordering-appfor-fords-sync/#6e9b1a253f9a.

Greg Gardner, "GM wants you to shop from your car for food, gasoline and hotels," online article, Dec. 5, 2017, URL:https://www.usatoday.com/story/money/cars/2017/12/05/gm-marketplace/9224610017.

\* cited by examiner

VEHICLE VIRTUAL ASSISTANT SYSTEMS AND METHODS FOR PROCESSING A REQUEST FOR AN ITEM FROM A USER

TECHNICAL FIELD

Embodiments described herein generally relate to vehicle virtual assistance systems and, more specifically, to vehicle virtual assistance systems for processing an order of an item from a user in a vehicle.

BACKGROUND

Occupants in a vehicle may interact with a speech recognition system of the vehicle. The speech recognition system may receive and process speech input, and perform various actions based on the speech input. Speech recognition systems may include a number of features accessible to a user of the speech recognition system. For example, the user of the vehicle may request information about a store that sells an item the user is looking for from the speech recognition system. If the store closes before the vehicle arrives at the store, the user may need to find another way to obtain the item.

Accordingly, a need exists for a vehicle virtual assistance system that may save time from finding other options in case the vehicle cannot arrive at a store before the closing time of the store.

SUMMARY

In one embodiment, the vehicle virtual assistance system includes one or more processors, one or more memory modules communicatively coupled to the one or more processors, an input device communicatively coupled to the one or more processors, an output device communicatively coupled to the one or more processors, and machine readable instructions stored in the one or more memory modules. The virtual assistance system receives, through the input device, a request for an item from a user, retrieves a location of an entity associated the item, calculates an estimated arrival time when the vehicle will arrive at the location, compares the estimated arrival time with a predetermined time associated with the entity, and instructs the output device to generate a delivery prompt related to the item in response to comparing the estimated arrival time with the predetermined time.

In another embodiment, a method for implementing a request from a user is provided. The method includes receiving, through an input device of a vehicle, a request for an item from the user, retrieving, by a processor of the vehicle, a location of an entity associated the item, calculating, by the processor, an estimated arrival time when the vehicle will arrive at the location, comparing the estimated arrival time with a predetermined time associated with the entity, and instructing an output device of the vehicle to generate a delivery prompt related to the item in response to comparing the estimated arrival time with the predetermined time.

In another embodiment, a virtual assistance system for a vehicle includes one or more processors, one or more memory modules communicatively coupled to the one or more processors, a microphone communicatively coupled to the one or more processors, a speaker communicatively coupled to the one or more processors, and machine readable instructions stored in the one or more memory modules. The virtual assistance system receives, through the input device, a request for a food item from a user, retrieves a location of a restaurant that serves the food item, calculates an estimated arrival time when the vehicle arrives at the restaurant, compares the estimated arrival time with a closing time of the restaurant, and instructs the speaker to generate a delivery prompt related to the restaurant in response to comparing the estimated arrival time with the closing time.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include vehicle virtual assistance systems for processing an order of an item from a user in a vehicle. The vehicle virtual assistance system includes one or more processors, one or more memory modules communicatively coupled to the one or more processors, an input device communicatively coupled to the one or more processors, an output device communicatively coupled to the one or more processors, and machine readable instructions stored in the one or more memory modules. The virtual assistance system receives, through the input device, a request for an item from a user, retrieves a location of an entity associated the item, calculates an estimated arrival time when the vehicle will arrive at the location, compares the estimated arrival time with a predetermined time associated with the entity, and instructs the output device to generate a delivery prompt related to the item in response to comparing the estimated arrival time with the predetermined time. The various vehicle virtual assistance systems for processing an order of an item will be described in more detail herein with specific reference to the corresponding drawings.

Figure 1:
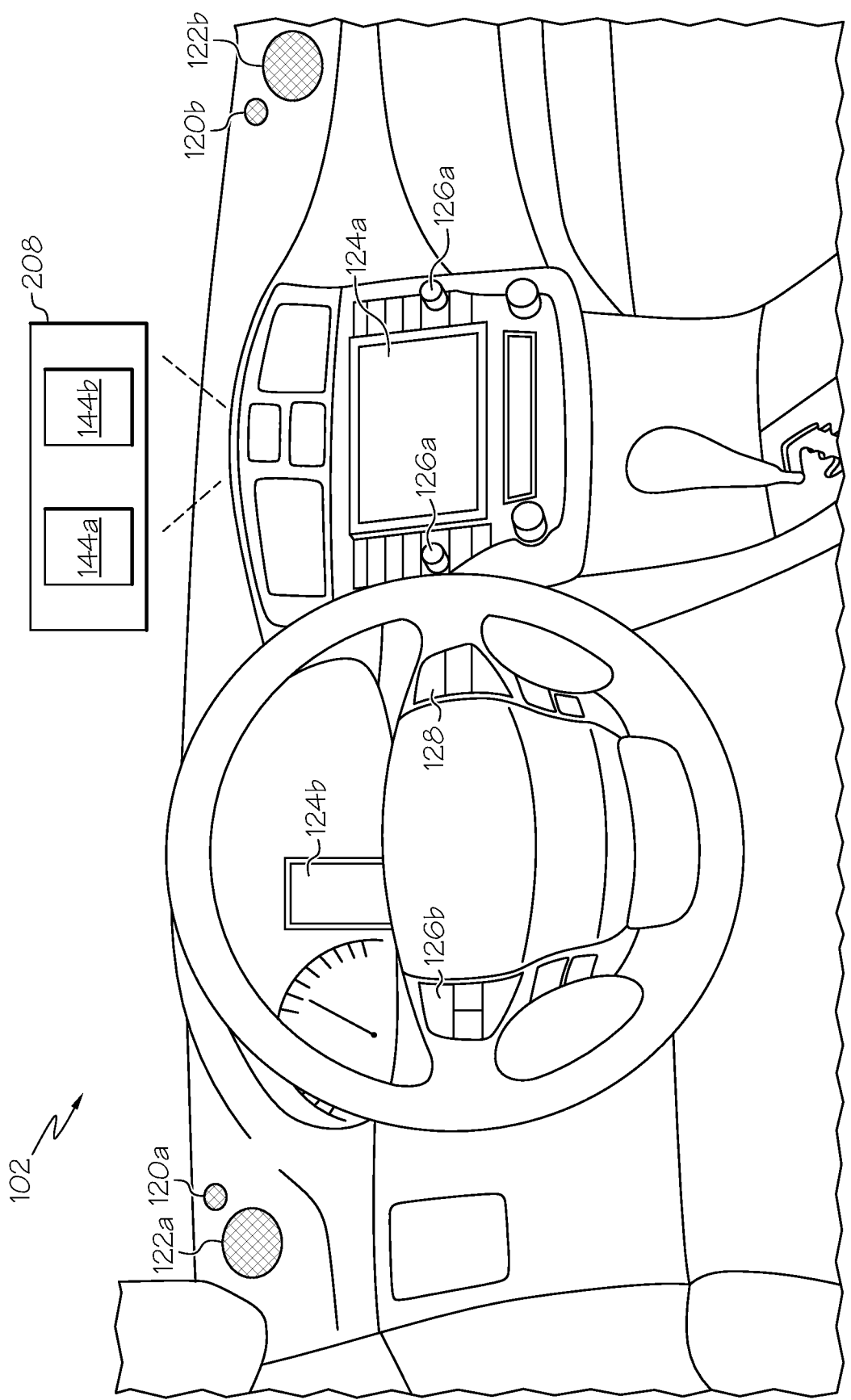
FIG. 1 schematically depicts an interior portion of a vehicle for providing a vehicle virtual assistance system, according to one or more embodiments shown and described herein.

Referring now to the drawings, FIG. 1 schematically depicts an interior portion of a vehicle 102 for providing virtual assistance, according to embodiments disclosed herein. As illustrated, the vehicle 102 may include a number of components that may provide input to or output from the vehicle virtual assistance systems described herein. The interior portion of the vehicle 102 includes a console display 124a and a dash display 124b (referred to independently and/or collectively herein as "display 124"). The console display 124a may be configured to provide one or more user interfaces and may be configured as a touch screen and/or include other features for receiving user input. The dash display 124b may similarly be configured to provide one or more interfaces, but often the data provided in the dash display 124b is a subset of the data provided by the console display 124a. Regardless, at least a portion of the user interfaces depicted and described herein may be provided on either or both the console display 124a and the dash display 124b. The vehicle 102 also includes one or more microphones 120a, 120b (referred to independently and/or collectively herein as "microphone 120") and one or more speakers 122a, 122b (referred to independently and/or collectively herein as "speaker 122"). The one or more microphones 120 may be configured for receiving user voice commands and/or other inputs to the vehicle virtual assistance systems described herein. Similarly, the speakers 122 may be utilized for providing audio content from the vehicle virtual assistance system to the user. The microphone 120, the speaker 122, and/or related components may be part of an in-vehicle audio system. The vehicle 102 also includes tactile input hardware 126a and/or peripheral tactile input hardware 126b for receiving tactile user input, as will be described in further detail below. The vehicle 102 also includes an activation switch 128 for providing an activation input to the vehicle virtual assistance system, as will be described in further detail below.

The vehicle 102 may also include a virtual assistance module 208, which stores voice input analysis logic 144a, and response generation logic 144b. The voice input analysis logic 144a and the response generation logic 144b may include a plurality of different pieces of logic, each of which may be embodied as a computer program, firmware, and/or hardware, as an example. The voice input analysis logic 144a may be configured to execute one or more local speech recognition algorithms on speech input received from the microphone 120, as will be described in further detail below. The response generation logic 144b may be configured to generate responses to the speech input, such as by causing audible sequences to be output by the speaker 122 or causing imagery to be provided to the display 124, as will be described in further detail below.

Figure 2:
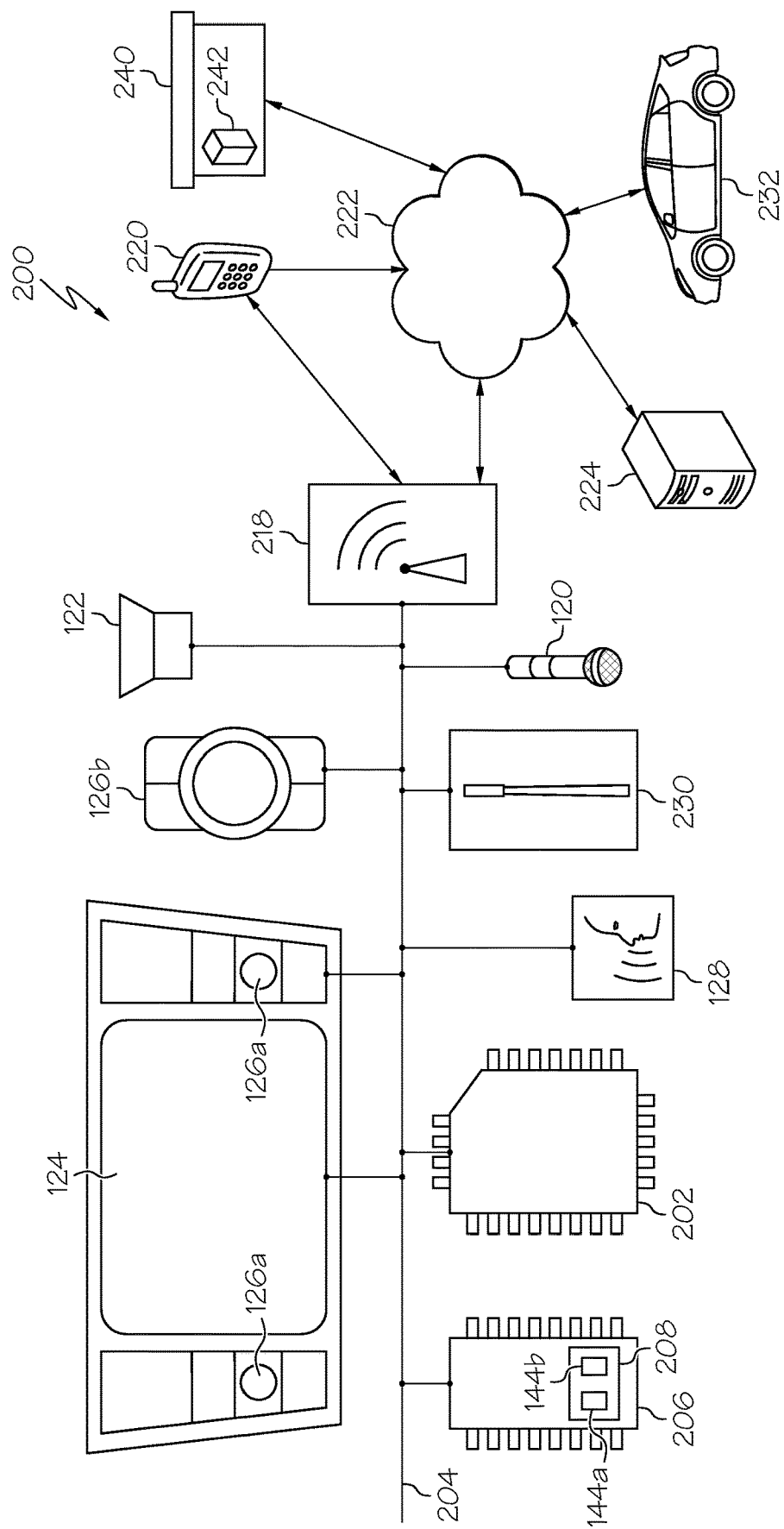
FIG. 2 schematically depicts a vehicle virtual assistance system, according to one or more embodiments shown and described herein.

Referring now to FIG. 2, an embodiment of a vehicle virtual assistance system 200, including a number of the components depicted in FIG. 1, is schematically depicted. It should be understood that the vehicle virtual assistance system 200 may be integrated within the vehicle 102 or may be embedded within a mobile device (e.g., smartphone, laptop computer, etc.) carried by a driver of the vehicle.

The vehicle virtual assistance system 200 includes one or more processors 202, a communication path 204, one or more memory modules 206, a display 124, a speaker 122, tactile input hardware 126a, a peripheral tactile input hardware 126b, a microphone 120, an activation switch 128, a virtual assistance module 208, network interface hardware 218, and a satellite antenna 230. The various components of the vehicle virtual assistance system 200 and the interaction thereof will be described in detail below.

As noted above, the vehicle virtual assistance system 200 includes the communication path 204. The communication path 204 may be formed from any medium that is capable of transmitting a signal such as, for example, conductive wires, conductive traces, optical waveguides, or the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 204 communicatively couples the various components of the vehicle virtual assistance system 200. As used herein, the term "communicatively coupled" means that coupled components are capable of exchanging data signals with one another such as, for example, electrical signals via conductive medium, electromagnetic signals via air, optical signals via optical waveguides, and the like.

As noted above, the vehicle virtual assistance system 200 includes the one or more processors 202. Each of the one or more processors 202 may be any device capable of executing machine readable instructions. Accordingly, each of the one or more processors 202 may be a controller, an integrated circuit, a microchip, a computer, or any other computing device. The one or more processors 202 are communicatively coupled to the other components of the vehicle virtual assistance system 200 by the communication path 204. Accordingly, the communication path 204 may communicatively couple any number of processors with one another, and allow the modules coupled to the communication path 204 to operate in a distributed computing environment. Specifically, each of the modules may operate as a node that may send and/or receive data.

As noted above, the vehicle virtual assistance system 200 includes the one or more memory modules 206. Each of the one or more memory modules 206 of the vehicle virtual assistance system 200 is coupled to the communication path 204 and communicatively coupled to the one or more processors 202. The one or more memory modules 206 may comprise RAM, ROM, flash memories, hard drives, or any device capable of storing machine readable instructions such that the machine readable instructions may be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 206. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In embodiments, the one or more memory modules 206 include the virtual assistance module 208 that processes speech input signals received from the microphone 120 and/or extracts speech information from such signals, as will be described in further detail below. Furthermore, the one or more memory modules 206 include machine readable instructions that, when executed by the one or more processors 202, cause the vehicle virtual assistance system 200 to perform the actions described below including the steps described in FIG. 3. The virtual assistance module 208 includes voice input analysis logic 144*a* and response generation logic 144*b*.

The voice input analysis logic 144*a* and response generation logic 144*b* may be stored in the one or more memory modules 206. In embodiments, the voice input analysis logic 144*a* and response generation logic 144*b* may be stored on, accessed by and/or executed on the one or more processors 202. In embodiments, the voice input analysis logic 144*a* and response generation logic 144*b* may be executed on and/or distributed among other processing systems to which the one or more processors 202 are communicatively linked. For example, at least a portion of the voice input analysis logic 144*a* may be located onboard the vehicle 102. In one or more arrangements, a first portion of the voice input analysis logic 144*a* may be located onboard the vehicle 102, and a second portion of the voice input analysis logic 144*a* may be located remotely from the vehicle 102 (e.g., on a cloud-based server, a remote computing system, and/or the one or more processors 202). In some embodiments, the voice input analysis logic 144*a* may be located remotely from the vehicle 102.

The voice input analysis logic 144*a* may be implemented as computer readable program code that, when executed by a processor, implements one or more of the various processes described herein. The voice input analysis logic 144*a* may be a component of one or more processors 202, or the voice input analysis logic 144*a* may be executed on and/or distributed among other processing systems to which one or more processors 202 is operatively connected. In one or more arrangements, the voice input analysis logic 144*a* may include artificial or computational intelligence elements, e.g., neural network, fuzzy logic or other machine learning algorithms.

The voice input analysis logic 144*a* may receive one or more occupant voice inputs from one or more vehicle occupants of the vehicle 102. The one or more occupant voice inputs may include any audial data spoken, uttered, pronounced, exclaimed, vocalized, verbalized, voiced, emitted, articulated, and/or stated aloud by a vehicle occupant. The one or more occupant voice inputs may include one or more letters, one or more words, one or more phrases, one or more sentences, one or more numbers, one or more expressions, and/or one or more paragraphs, etc.

The one or more occupant voice inputs may be sent to, provided to, and/or otherwise made accessible to the voice input analysis logic 144*a*. The voice input analysis logic 144*a* may be configured to analyze the occupant voice inputs. The voice input analysis logic 144*a* may analyze the occupant voice inputs in various ways. For example, the voice input analysis logic 144*a* may analyze the occupant voice inputs using any known natural language processing system or technique. Natural language processing may include analyzing each user's notes for topics of discussion, deep semantic relationships and keywords. Natural language processing may also include semantics detection and analysis and any other analysis of data including textual data and unstructured data. Semantic analysis may include deep and/or shallow semantic analysis. Natural language processing may also include discourse analysis, machine translation, morphological segmentation, named entity recognition, natural language understanding, optical character recognition, part-of-speech tagging, parsing, relationship extraction, sentence breaking, sentiment analysis, speech recognition, speech segmentation, topic segmentation, word segmentation, stemming and/or word sense disambiguation. Natural language processing may use stochastic, probabilistic and statistical methods. In some embodiments, the voice input analysis logic 144*a* may analyze the occupant voice inputs to identify the occupant. For example, the voice input analysis logic 144*a* may compare the occupant voice inputs with samples associated with different users, and identify that the occupant voice inputs are comparable to a sample associated with a certain user.

The voice input analysis logic 144*a* may analyze the occupant voice inputs to determine whether one or more commands and/or one or more inquiries are included in the occupant voice inputs. A command may be any request to take an action and/or to perform a task. An inquiry includes any questions asked by a user. The voice input analysis logic 144*a* may analyze the vehicle operational data in real-time or at a later time. As used herein, the term "real time" means a level of processing responsiveness that a user or system senses as sufficiently immediate for a particular process or determination to be made, or that enables the processor to keep up with some external process.

Still referring to FIG. 2, the vehicle virtual assistance system 200 comprises the display 124 for providing visual output such as, for example, information, entertainment, maps, navigation, information, or a combination thereof. The display 124 is coupled to the communication path 204 and communicatively coupled to the one or more processors 202. Accordingly, the communication path 204 communicatively couples the display 124 to other modules of the vehicle virtual assistance system 200. The display 124 may include any medium capable of transmitting an optical output such as, for example, a cathode ray tube, light emitting diodes, a liquid crystal display, a plasma display, or the like. Moreover, the display 124 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 124 may include at least one of the one or more processors 202 and the one or memory modules 206. While the vehicle virtual assistance system 200 includes a display 124 in the embodiment depicted in FIG. 2, the vehicle virtual assistance system 200 may not include a display 124 in other embodiments, such as embodiments in which the vehicle virtual assistance system 200 audibly provides outback or feedback via the speaker 122.

As noted above, the vehicle virtual assistance system 200 includes the speaker 122 for transforming data signals from the vehicle virtual assistance system 200 into mechanical vibrations, such as in order to output audible prompts or audible information from the vehicle virtual assistance system 200. The speaker 122 is coupled to the communication path 204 and communicatively coupled to the one or more processors 202.

Still referring to FIG. 2, the vehicle virtual assistance system 200 comprises tactile input hardware 126*a* coupled to the communication path 204 such that the communication path 204 communicatively couples the tactile input hardware 126*a* to other modules of the vehicle virtual assistance system 200. The tactile input hardware 126a may be any device capable of transforming mechanical, optical, or electrical signals into a data signal capable of being transmitted with the communication path 204. Specifically, the tactile input hardware 126a may include any number of movable objects that each transform physical motion into a data signal that may be transmitted to over the communication path 204 such as, for example, a button, a switch, a knob, a microphone or the like. In some embodiments, the display 124 and the tactile input hardware 126a are combined as a single module and operate as an audio head unit or an infotainment system. However, it is noted, that the display 124 and the tactile input hardware 126a may be separate from one another and operate as a single module by exchanging signals via the communication path 204. While the vehicle virtual assistance system 200 includes tactile input hardware 126a in the embodiment depicted in FIG. 2, the vehicle virtual assistance system 200 may not include tactile input hardware 126a in other embodiments, such as embodiments that do not include the display 124.

As noted above, the vehicle virtual assistance system 200 optionally comprises the peripheral tactile input hardware 126b coupled to the communication path 204 such that the communication path 204 communicatively couples the peripheral tactile input hardware 126b to other modules of the vehicle virtual assistance system 200. For example, in one embodiment, the peripheral tactile input hardware 126b is located in a vehicle console to provide an additional location for receiving input. The peripheral tactile input hardware 126b operates in a manner substantially similar to the tactile input hardware 126a, i.e., the peripheral tactile input hardware 126b includes movable objects and transforms motion of the movable objects into a data signal that may be transmitted over the communication path 204.

As noted above, the vehicle virtual assistance system 200 comprises the microphone 120 for transforming acoustic vibrations received by the microphone into a speech input signal. The microphone 120 is coupled to the communication path 204 and communicatively coupled to the one or more processors 202. As will be described in further detail below, the one or more processors 202 may process the speech input signals received from the microphone 120 and/or extract speech information from such signals.

Still referring to FIG. 2, the vehicle virtual assistance system 200 comprises the activation switch 128 for activating or interacting with the vehicle virtual assistance system 200. In some embodiments, the activation switch 128 is an electrical switch that generates an activation signal when depressed, such as when the activation switch 128 is depressed by a user when the user desires to utilize or interact with the vehicle virtual assistance system 200. In some embodiments, the vehicle virtual assistance system 200 does not include the activation switch. Instead, when a user says a certain word (e.g., "Roxy"), the vehicle virtual assistance system 200 becomes ready to recognize words spoken by the user.

As noted above, the vehicle virtual assistance system 200 includes the network interface hardware 218 for communicatively coupling the vehicle virtual assistance system 200 with a mobile device 220 or a computer network. The network interface hardware 218 is coupled to the communication path 204 such that the communication path 204 communicatively couples the network interface hardware 218 to other modules of the vehicle virtual assistance system 200. The network interface hardware 218 may be any device capable of transmitting and/or receiving data via a wireless network. Accordingly, the network interface hardware 218 may include a communication transceiver for sending and/or receiving data according to any wireless communication standard. For example, the network interface hardware 218 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 218 includes a Bluetooth transceiver that enables the vehicle virtual assistance system 200 to exchange information with the mobile device 220 (e.g., a smartphone) via Bluetooth communication.

Still referring to FIG. 2, data from various applications running on the mobile device 220 may be provided from the mobile device 220 to the vehicle virtual assistance system 200 via the network interface hardware 218. The mobile device 220 may be any device having hardware (e.g., chipsets, processors, memory, etc.) for communicatively coupling with the network interface hardware 218 and a cellular network 222. Specifically, the mobile device 220 may include an antenna for communicating over one or more of the wireless computer networks described above. Moreover, the mobile device 220 may include a mobile antenna for communicating with the cellular network 222. Accordingly, the mobile antenna may be configured to send and receive data according to a mobile telecommunication standard of any generation (e.g., 1G, 2G, 3G, 4G, 5G, etc.). Specific examples of the mobile device 220 include, but are not limited to, smart phones, tablet devices, e-readers, laptop computers, or the like.

The cellular network 222 generally includes a plurality of base stations that are configured to receive and transmit data according to mobile telecommunication standards. The base stations are further configured to receive and transmit data over wired systems such as public switched telephone network (PSTN) and backhaul networks. The cellular network 222 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the cellular network 222 may be utilized as a wireless access point by the network interface hardware 218 or the mobile device 220 to access one or more servers (e.g., a server 224). The server 224 generally includes processors, memory, and chipset for delivering resources via the cellular network 222. Resources may include providing, for example, processing, storage, software, and information from the server 224 to the vehicle virtual assistance system 200 via the cellular network 222.

Still referring to FIG. 2, the one or more servers accessible by the vehicle virtual assistance system 200 via the communication link of the mobile device 220 to the cellular network 222 may include third party servers that provide additional speech recognition capability. For example, the server 224 may include speech recognition algorithms capable of recognizing more words than the local speech recognition algorithms stored in the one or more memory modules 206. It should be understood that the network interface hardware 218 or the mobile device 220 may be communicatively coupled to any number of servers by way of the cellular network 222.

The network interface hardware 218 may be communicatively coupled to the cellular network 222 and may communicate with another vehicle 232 and the store server 242 via the cellular network 222. The vehicle virtual assistance system 200 may retrieve store information (e.g., store opening time, closing time, store location, etc.) from the store server 242. In some embodiments, the store information may be stored in the server 224 and the vehicle virtual assistance system 200 may retrieve the store information from the server 224. The vehicle virtual assistance system 200 may send out instructions to another vehicle 232 via the cellular network 222. For example, the network interface hardware 218 transmits instructions for coming to the store 240 to another vehicle 232 via the cellular network 222. The instructions may include a task requested by the user of the vehicle 102, e.g., delivering a food ordered by the user to user's home or to a designated place. In some embodiments, the network interface hardware 218 transmits instructions for ordering an item in the store 240 to the store server 242 or the server 224 via the cellular network 222.

As noted above, the vehicle virtual assistance system 200 optionally includes a satellite antenna 230 coupled to the communication path 204 such that the communication path 204 communicatively couples the satellite antenna 230 to other modules of the vehicle virtual assistance system 200. The satellite antenna 230 is configured to receive signals from global positioning system satellites. Specifically, in one embodiment, the satellite antenna 230 includes one or more conductive elements that interact with electromagnetic signals transmitted by global positioning system satellites. The received signal is transformed into a data signal indicative of the location (e.g., latitude and longitude) of the satellite antenna 230 or an object positioned near the satellite antenna 230, by the one or more processors 202.

Additionally, it is noted that the satellite antenna 230 may include at least one of the one or more processors 202 and the one or memory modules 206. In embodiments where the vehicle virtual assistance system 200 is coupled to a vehicle, the one or more processors 202 execute machine readable instructions to transform the global positioning satellite signals received by the satellite antenna 230 into data indicative of the current location of the vehicle. While the vehicle virtual assistance system 200 includes the satellite antenna 230 in the embodiment depicted in FIG. 2, the vehicle virtual assistance system 200 may not include the satellite antenna 230 in other embodiments, such as embodiments in which the vehicle virtual assistance system 200 does not utilize global positioning satellite information or embodiments in which the vehicle virtual assistance system 200 obtains global positioning satellite information from the mobile device 220 via the network interface hardware 218.

Still referring to FIG. 2, it should be understood that the vehicle virtual assistance system 200 may be formed from a plurality of modular units, i.e., the display 124, the speaker 122, tactile input hardware 126a, the peripheral tactile input hardware 126b, the microphone 120, the activation switch 128, etc. may be formed as modules that when communicatively coupled form the vehicle virtual assistance system 200. Accordingly, in some embodiments, each of the modules may include at least one of the one or more processors 202 and/or the one or more memory modules 206. Accordingly, it is noted that, while specific modules may be described herein as including a processor and/or a memory module, the embodiments described herein may be implemented with the processors and memory modules distributed throughout various communicatively coupled modules.

Figure 3:
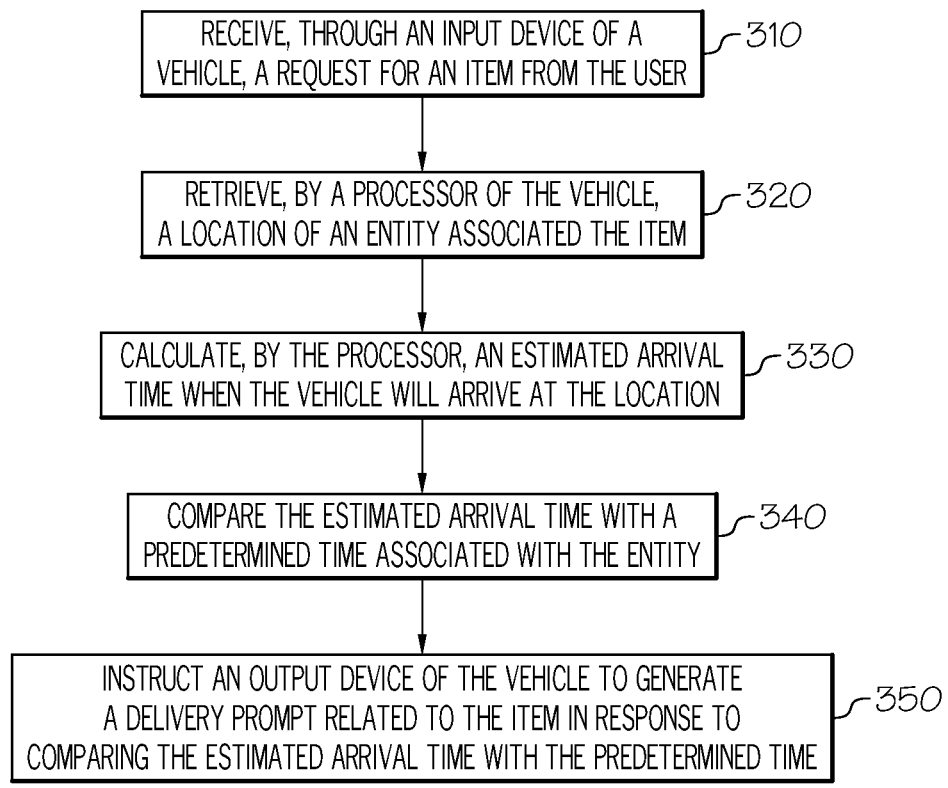
FIG. 3 depicts a flowchart for providing a delivery prompt in response to a request for an item, according to one or more embodiments shown and described herein.

FIG. 3 depicts a flowchart for providing a delivery prompt in response to a request for an item, according to one or more embodiments shown and described herein. In block 310, the vehicle virtual assistance system 200 receives, through an input device of a vehicle, a request for an item from a user. In embodiments, the vehicle virtual assistance system 200 receives a voice input from a user requesting a food item through the microphone 120. For example, the vehicle virtual assistance system 200 receives a vocal statement "Roxy, I am hungry. Find me a place that serves burritos" from a user through the microphone 120. The voice input analysis logic 144a may analyze the vocal statement and activate the vehicle virtual assistance system 200 in response to identifying "Roxy" in the statement. Then, the voice input analysis logic 144a may analyze the vocal statement to identify "burritos" as a requested item (e.g., a meal). In some embodiments, the vehicle virtual assistance system 200 may receive an input from the user through other input devices, e.g., the display 124, the tactile input hardware 126a, 126b, etc. For example, a user may touch the display 124 to select a food item, and the information about the food item is transmitted to the vehicle virtual assistance system 200. As another example, a user may manipulate the tactile input hardware 126a, 126b to select a food item, and the information about the food item is transmitted to the vehicle virtual assistance system 200.

In block 320, the vehicle virtual assistance system 200 may retrieve, by the one or more processors 202 of the vehicle virtual assistance system 200, a location of an entity associated with the item. In embodiments, the vehicle virtual assistance system 200 retrieves an entity associated with the item from an entity database. For example, the vehicle virtual assistance system 200 retrieves an entity associated with the item from a point-of-interest (POI) database. The point-of-interest database includes a list of entities, locations of the entities, and services provided by the entities related to the requested item. The point-of-interest database may be periodically updated by receiving updated data from the mobile device 220, the server 224, or any other devices that store the updated data.

In the example, the vehicle virtual assistance system 200 retrieves the location of a restaurant that serves burritos from the POI database. The vehicle virtual assistance system 200 may retrieve more than one restaurant and the locations of the restaurants. The POI database may be stored in the one or more memory modules 206. In some embodiments, the POI database may be stored in a remote server (e.g., the server 224), and the vehicle virtual assistance system 200 may access the remote server to retrieve the location of the restaurant that serves burritos.

Figure 4:
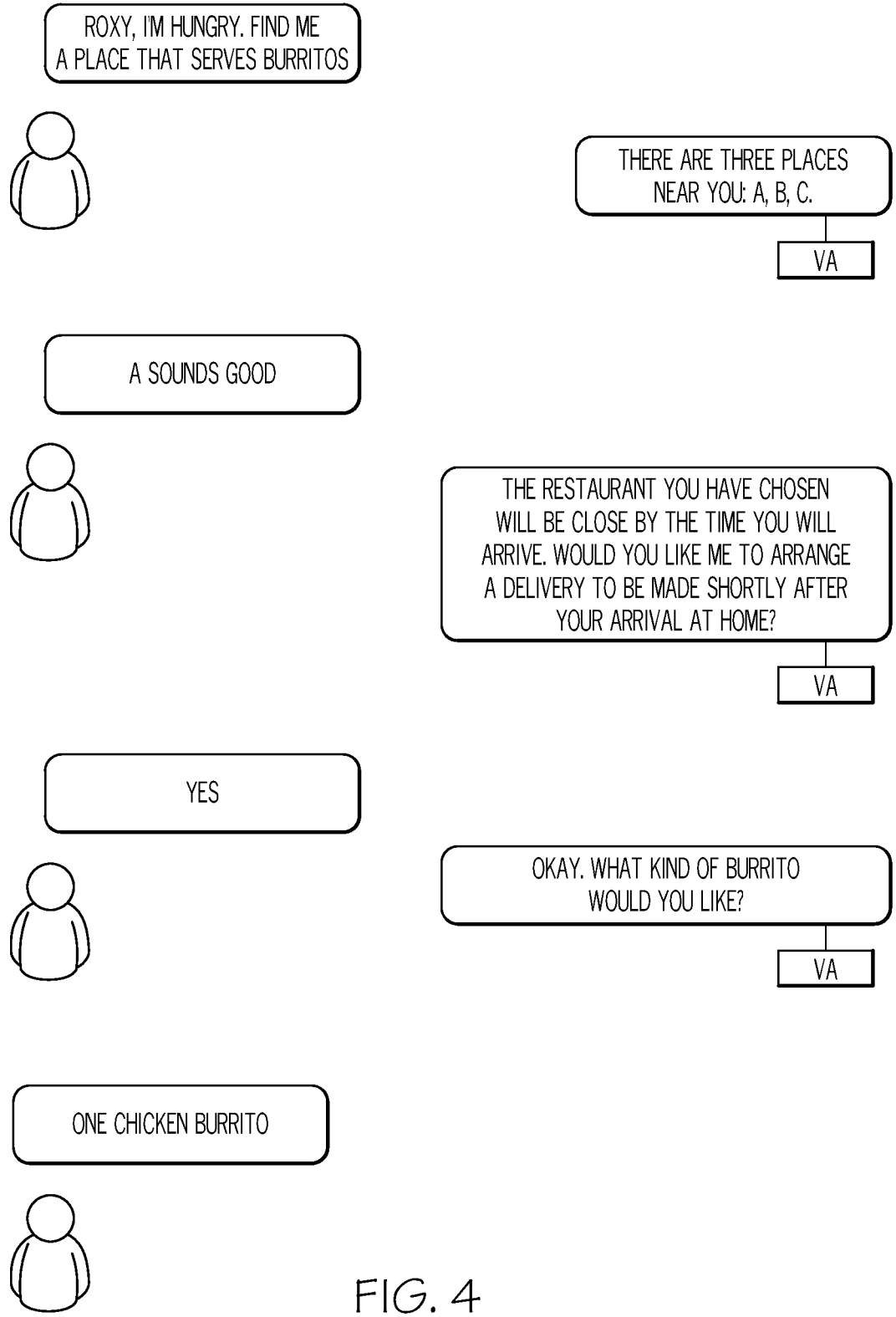
FIG. 4 depicts an interaction between a user and a vehicle virtual assistance system, according to one or more embodiments shown and described herein.

In embodiments, the vehicle virtual assistance system 200 may output a response in response to the request from the user. For example, as shown in FIG. 4, in response to the statement "Roxy, I'm hungry. Find me a place that serves burritos," the response generation logic 144b creates a statement, e.g., "There are three places near you: Restaurant A, B, and C." The vehicle virtual assistance system 200 may instruct the speaker 122 to output the statement. As another example, the vehicle virtual assistance system 200 may instruct the display 124 to display the statement. In response to the output by the vehicle virtual assistance system 200, the use may select one of the restaurants by stating, e.g., "A sounds good," as shown in FIG. 4.

In block 330, the vehicle virtual assistance system 200 may calculate, by the one or more processors 202 of the vehicle virtual assistance system 200, an estimated arrival time when the vehicle arrives at the location retrieved in block 320. In embodiments, the vehicle virtual assistance system 200 retrieves the current location of the vehicle, and calculates the estimated arrival time based on a route between the vehicle and the location, the current vehicle speed, and/or current traffic information about the route.

In block 340, the vehicle virtual assistance system 200 may compare the estimated arrival time with a predetermined time associates with the entity. In embodiments, the vehicle virtual assistance system 200 determines whether the estimated arrival time is after the predetermined time associated with the entity. For example, the vehicle virtual assistance system 200 determines whether the estimated arrival time is after the closing time of restaurant A. In some embodiments, the vehicle virtual assistance system 200 determines whether the estimated arrival time is within a threshold time period (e.g., 10 minutes, 20 minutes) prior to the predetermined time, such as an amount of time necessary to eat a meal before the restaurant is closed. The threshold time may be previously set up by the user. As another example, the threshold time may be determined based on the type of entity (e.g., 20 minutes for dine-in restaurants, 10 minutes for fast food restaurants, 5 minutes for supermarkets).

In block 350, the vehicle virtual assistance system 200 may instruct the output device of the vehicle to generate a delivery prompt related to the item in response to comparing the estimated arrival time with the predetermined time. In embodiments, the vehicle virtual assistance system 200 may instruct the speaker 122 to generate a deliver prompt related to the entity in response to determining that the estimated arrival time is after the predetermined time. For example, if it is determined that the estimated arrival time is after the closing time of restaurant A, the vehicle virtual assistance system 200 may instruct the speaker 122 to generate a deliver prompt, e.g., "The restaurant you have chosen will be closed by the time you will arrive. Would you like to arrange a delivery to be made shortly after you arrive at home?" as shown in FIG. 4. As another example, the vehicle virtual assistance system 200 may instruct the display 124 to display the delivery prompt. In response to the delivery prompt, the user may respond "yes" as shown in FIG. 4.

In response to the user's reply, the vehicle virtual assistance system 200 may ask for details about the item to be ordered, e.g., "Okay. What kind of burrito would you like?" In response, the user may respond "one chicken burrito." As shown in FIG. 4. Then, the vehicle virtual assistance system 200 may transmit an order to the server of restaurant A via the cellular network 222. As another example, the user may select a previous order by stating "the same as the previous one," and the vehicle virtual assistance system 200 may transmit an order to the server of restaurant A via the cellular network 222.

In some embodiments, the vehicle virtual assistance system 200 may instruct the speaker 122 to generate a deliver prompt related to the entity in response to determining that the estimated arrival time is within a threshold time period prior to the predetermined time. For example, if it is determined that the estimated arrival time is 5 minutes before the closing time of restaurant A and the threshold time period is 10 minutes, the vehicle virtual assistance system 200 may instruct the speaker 122 to generate a deliver prompt, e.g., "The restaurant you have chosen will be closed shortly after you arrive. Would you like to arrange a pick up?"

In some embodiments, the place where the item is to be delivered is determined based on the current destination of the vehicle. For example, GPS navigation information may indicate the current destination of the vehicle to be 456 Fifth Street, or which the vehicle is estimated to arrive at 9:30 pm. If the estimated arrival time at restaurant A is 9:10 pm, and restaurant A closes at 9 pm, the place where the burrito is to be delivered may be determined to be 456 Fifth Street based on the current destination. The vehicle virtual assistance system 200 may instruct the speaker 122 to generate a deliver prompt, e.g., "The restaurant you have chosen will be closed by the time you will arrive. Would you like to arrange a delivery to be made to 456 Fifth Street?"

In some embodiments, the place where the item is to be delivered is determined based on the calendar data for the user including upcoming events. For example, the calendar data may include "a meeting with John at 9:30 pm at 123 main street on Friday August 25." If it is Friday August 25, the estimated arrival time is 9:10 pm, and restaurant A closes at 9 pm, the place where the burrito is to be delivered is determined to be 123 main street because the user will be at 123 main street at 9:30 pm based on the calendar data. The vehicle virtual assistance system 200 may instruct the speaker 122 to generate a deliver prompt, e.g., "The restaurant you have chosen will be closed by the time you will arrive. Would you like to arrange a delivery to be made to 123 main street?" In some embodiments, the calendar data may be retrieved based on the identified user. For example, if the voice input analysis logic 144a analyzes the occupant voice inputs and identifies the occupant as user A, then the calendar data for user A may be retrieved.

Figure 5:
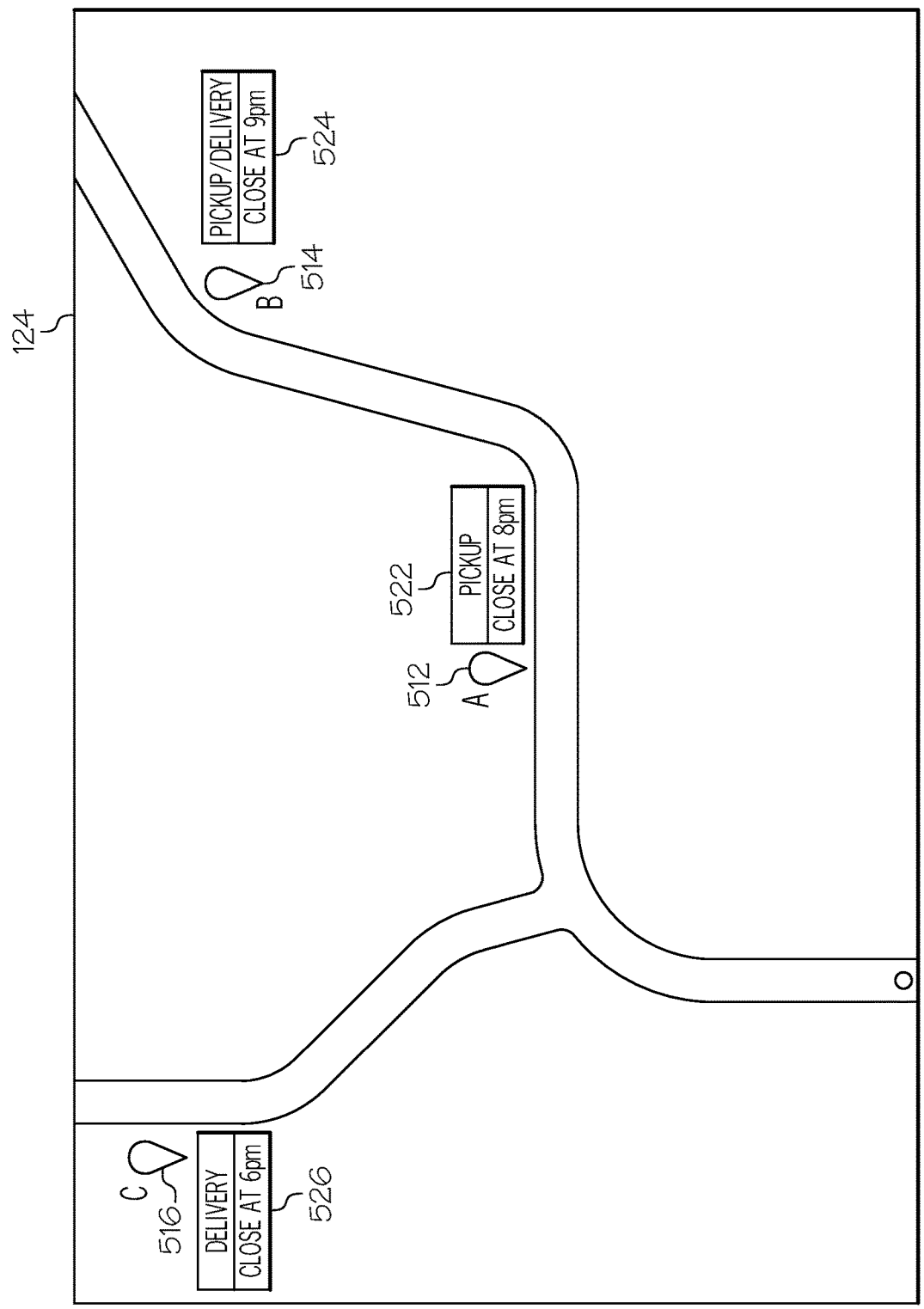
FIG. 5 depicts a navigation display showing one or more entities along with one or more available options associated with the entities, according to one or more embodiments shown and described herein.

FIG. 5 depicts a navigation display showing one or more entities along with one or more available options associated with the entities, according to one or more embodiments shown and described herein. In embodiments, in response to a request for an item from a user, the vehicle virtual assistance system 200 may display the locations of entities that provide the item on the display 124. For example, in response to a vocal statement "Roxy, I am hungry. Find me a place that serves burritos," the vehicle virtual assistance system 200 may display the locations of the restaurants A, B, and C that serve burritos on the display 124 as shown in FIG. 5. The display 124 may also display the available options for the restaurants A, B, and C, respectively. For example, the display 124 displays available services options, i.e., a pick-up option 522 for restaurant A, a pick up option and a delivery option 524 for restaurant B, and a delivery option 526 for restaurant C. The display 124 may also display closing time of the restaurants A, B, and C. For example, the display 124 may show "Close at 8 pm" for restaurant A, "Close at 9 pm" for restaurant B, and "Close at 6 pm" for restaurant C.

Based on the available options, the vehicle virtual assistance system 200 may suggest available options. For example, if the user selects restaurant A and the estimated arrival time is 7:55 pm, the vehicle virtual assistance system 200 may generate a pick-up prompt, e.g., "The restaurant you have chosen will be closed shortly after you arrive. Would you like to order burritos and pick up at restaurant A?" As another example, if the user selects restaurant B and the estimated arrival time is 8:55 pm, the vehicle virtual assistance system 200 may generate a delivery prompt describing two available options, e.g., "The restaurant you have chosen will be closed shortly after you arrive. Would you like to order burritos and pick up at the restaurant A or would you like to arrange a delivery to be made shortly after you arrive at home?" As another example, if the user selects restaurant C and the estimated arrival time is 6:10 pm, the vehicle virtual assistance system 200 may generate a delivery prompt, e.g., "The restaurant you have chosen will be closed by the time you will arrive. Would you like to arrange a delivery to be made shortly after you arrive at home?"

In some embodiments, the entities may be supermarkets. For example, the vehicle virtual assistance system 200 receives a vocal statement "Roxy, I want bananas" from a user through the microphone 120. In response to a request for bananas from the user, the vehicle virtual assistance system 200 may display the locations of supermarkets that sell bananas on the display 124. For example, the vehicle virtual assistance system 200 may display the locations of the supermarkets that sell bananas on the display 124 as shown in FIG. 5. In some embodiments, the display 124 may also display the available options for the supermarkets A, B, and C, respectively. For example, the display 124 displays available services options, i.e., a pick-up option for supermarket A, a pick up option and a delivery option for supermarket B, and a delivery option for supermarket C. In some embodiments, the display 124 may also display closing time of the supermarkets A, B, and C. For example, the display 124 may show "Close at 8 pm" for supermarket A, "Close at 9 pm" for supermarket B, and "Close at 6 pm" for supermarket C.

In some embodiments, the entities may be office supply retailers. For example, the vehicle virtual assistance system 200 receives a vocal statement "Roxy, I want to order a box of letter-sized papers" from a user through the microphone 120. In response to the order from the user, the vehicle virtual assistance system 200 may display the locations of office supply retailers that sell a box of letter-sized papers on the display 124. For example, the vehicle virtual assistance system 200 may display the locations of the office supply retailers that sell a box of letter-sized papers on the display 124 as shown in FIG. 5. In some embodiments, the display 124 may also display the available options for the office supply retailers A, B, and C, respectively. For example, the display 124 displays available services options, i.e., a pick-up option for office supply retailer A, a pick up option and a delivery option for office supply retailer B, and a delivery option for office supply retailer C. In some embodiments, the display 124 may also display closing time of the office supply retailers A, B, and C. For example, the display 124 may show "Close at 8 pm" for office supply retailer A, "Close at 9 pm" for office supply retailer B, and "Close at 6 pm" for office supply retailer C.

Based on the available options, the vehicle virtual assistance system 200 may suggest available options including scheduling a pick up time. For example, if the user selects office supply retailer C and the estimated arrival time is 6:10 pm, the vehicle virtual assistance system 200 may generate a pick-up prompt, e.g., "The office supply retailer you have chosen will be closed by the time you will arrive. Would you like to arrange a delivery to be made shortly after you arrive at home, or would you like to order and schedule a pick-up time for tomorrow or later?" In response, the user may arrange a delivery of the box of letter-sized papers to his home, or schedule a pick-up time for tomorrow.

In some embodiments, the entities may be any other businesses where a user can order items, services, etc.

Figure 6:
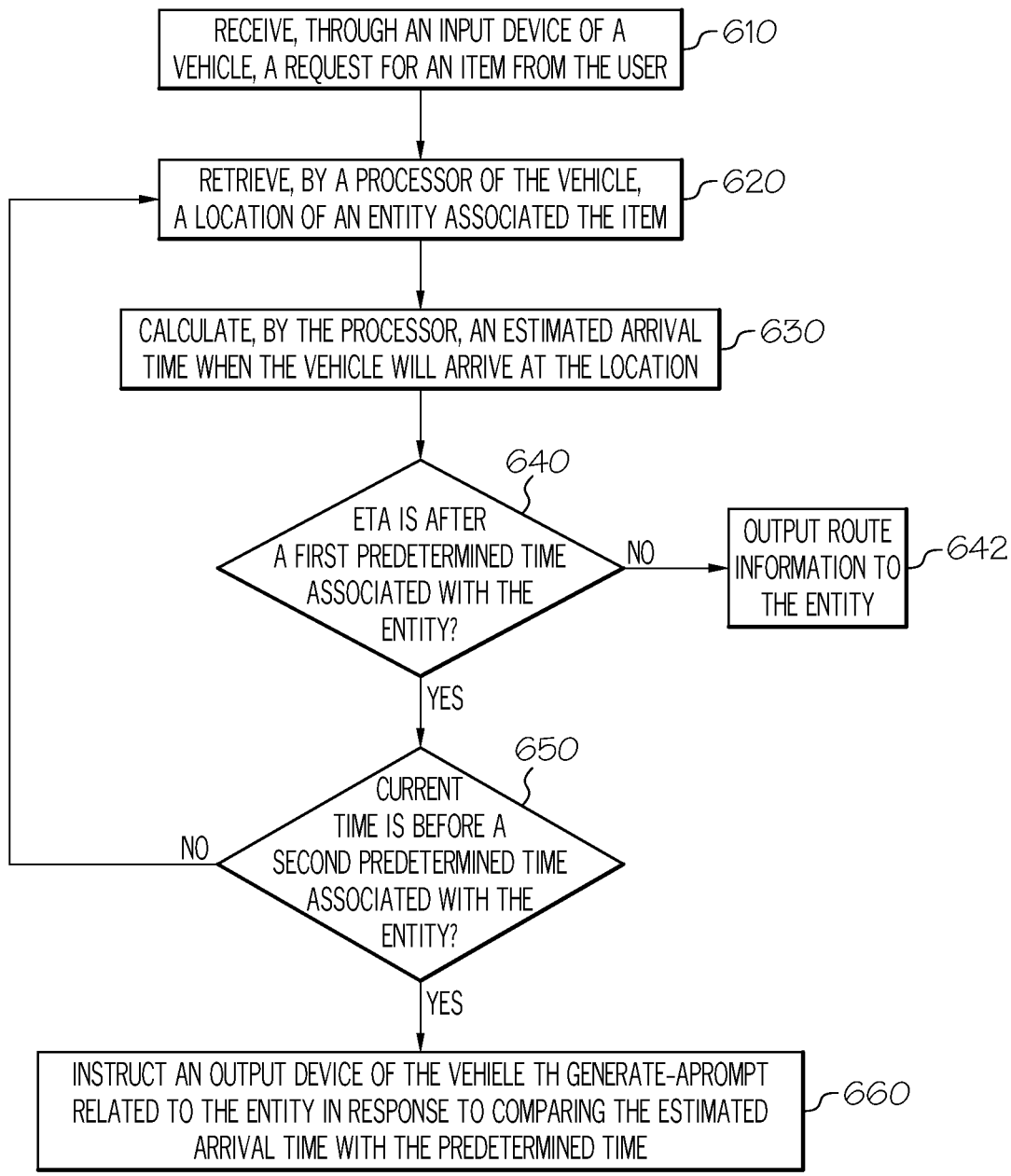
FIG. 6 depicts a flowchart for providing a delivery prompt in response to a request for an item, according to another embodiment shown and described herein.

FIG. 6 depicts a flowchart for providing a delivery prompt in response to a request for an item, according to another embodiment shown and described herein. In block 610, the vehicle virtual assistance system 200 receives, through an input device of a vehicle, a request for an item from a user. In embodiments, the vehicle virtual assistance system 200 receives a voice input from a user requesting a food item through the microphone 120. For example, the vehicle virtual assistance system 200 receives a vocal statement "Roxy, I am hungry. Find me a place that serves burritos" from a user through the microphone 120. The voice input analysis logic 144*a* may analyze the vocal statement and activate the vehicle virtual assistance system 200 in response to identifying "Roxy" in the statement. Then, the voice input analysis logic 144*a* may analyze the vocal statement to identify "burritos" as a requested item (e.g., a meal).

In block 620, the vehicle virtual assistance system 200 may retrieve, by the one or more processors 202 of the vehicle virtual assistance system 200, a location of an entity associated with the item. In embodiments, the vehicle virtual assistance system 200 retrieves an entity associated with the item from an entity database. For example, the vehicle virtual assistance system 200 retrieves an entity associated with the item from a point-of-interest (POI) database. The point-of-interest database includes a list of entities, locations of the entities, and services provided by the entities related to the requested item. The point-of-interest database may be periodically updated by receiving updated data from the mobile device 220, the server 224, or any other devices that store the updated data. In the example, the vehicle virtual assistance system 200 retrieves the location of a restaurant that serves burritos from the POI database. The vehicle virtual assistance system 200 may retrieve more than one restaurant and the locations of the restaurants. The POI database may be stored in the one or more memory modules 206. In some embodiments, the POI database may be stored in a remote server (e.g., the server 224), and the vehicle virtual assistance system 200 may access the remote server to retrieve the location of the restaurant that serves burritos.

In embodiments, the vehicle virtual assistance system 200 may output a response in response to the request from the user. For example, as shown in FIG. 4, in response to the statement "Roxy, I'm hungry. Find me a place that serves burritos," the response generation logic 144*b* creates a statement, e.g., "There are three places near you: Restaurant A, B, and C." The vehicle virtual assistance system 200 may instruct the speaker 122 to output the statement. As another example, the vehicle virtual assistance system 200 may instruct the display 124 to display the statement. In response to the output by the vehicle virtual assistance system 200, the use may select one of the restaurants by stating, e.g., "A sounds good," as shown in FIG. 4.

In block 630, the vehicle virtual assistance system 200 may calculate, by the one or more processors 202 of the vehicle virtual assistance system 200, an estimated arrival time when the vehicle arrives at the location retrieved in block 620. In embodiments, the vehicle virtual assistance system 200 retrieves the current location of the vehicle, and calculates the estimated arrival time based on a route between the vehicle and the location, the current vehicle speed, and/or current traffic information about the route.

In block 640, the vehicle virtual assistance system 200 may compare the estimated arrival time with a first predetermined time associated with the entity. In embodiments, the vehicle virtual assistance system 200 determines whether the estimated arrival time is after the first predetermined time associated with the entity. For example, the vehicle virtual assistance system 200 determines whether the estimated arrival time is after the closing time of restaurant A. In some embodiments, the vehicle virtual assistance system 200 determines whether the estimated arrival time is within a threshold time period (e.g., 10 minutes, 20 minutes) prior to the first predetermined time, such as an amount of time necessary to eat a meal before the restaurant is closed. The threshold time may be previously set up by the user. As another example, the threshold time may be determined based on the type of entity (e.g., 20 minutes for dine-in restaurants, 10 minutes for fast food restaurants, 5 minutes for supermarkets).

If it is determined that the estimated arrival time is not after the first predetermined time associated with the entity (no at block 640), the vehicle virtual assistance system 200 may output information about the route to the entity in block 642. For example, the vehicle virtual assistance system 200 may display one or more routes to the entity on a map on the display 124. As another example, the vehicle virtual assistance system 200 may display the estimated arrival time and the closing time of the entity on the display 124.

If it is determined that the estimated arrival time is after the first predetermined time associated with the entity (yes at block 640), then the process proceeds to block 650. In block 650, the vehicle virtual assistance system 200 may compare the current time with a second predetermined time associated with the entity. In embodiments, the vehicle virtual assistance system 200 determines whether the current time is before the second predetermined time associated with the entity. The second predetermined time may be a cutoff time for deliveries of items from the entity. The second predetermined time may be prior to the first predetermined time associated with the entity. For example, the cutoff time may be 10 minutes prior to the closing time of the entity by a threshold time. In some embodiments, the cutoff time may be the same as the closing time.

If it is determined that the current time is not before the second predetermined time associated with the entity (no at block 650), the vehicle virtual assistance system 200 may determine that delivery is unavailable from Restaurant A and retrieve a location of another entity associated with the item in block 620. For example, if it is determined that the current time is after the delivery cutoff time for Restaurant A, the vehicle virtual assistance system 200 may retrieve a location of Restaurant B or C.

If it is determined that the current time is before the second predetermined time associated with the entity (yes at block 650), the vehicle virtual assistance system 200 may determine that delivery from Restaurant A is available and instruct the output device of the vehicle to generate a delivery prompt related to the item in block 660. In embodiments, the vehicle virtual assistance system 200 may instruct the speaker 122 to generate a deliver prompt related to the entity in response to determining that the estimated arrival time is after the first predetermined time and that the current time is before the second predetermined time. For example, if it is determined that the estimated arrival time is after the closing time of restaurant A and the current time is before the cutoff time for delivery, the vehicle virtual assistance system 200 may instruct the speaker 122 to generate a deliver prompt, e.g., "The restaurant you have chosen will be closed by the time you will arrive. However, delivery options are available now. Would you like to arrange a delivery to be made shortly after you arrive at home?" As another example, the vehicle virtual assistance system 200 may instruct the display 124 to display the delivery prompt.

It should be understood that embodiments described herein provide for vehicle virtual assistance systems for processing a request for an item from a user in a vehicle. The vehicle virtual assistance system includes one or more processors, one or more memory modules communicatively coupled to the one or more processors, an input device communicatively coupled to the one or more processors, and an output device communicatively coupled to the one or more processors. The virtual assistance system receives, through the input device, a request for an item from a user, retrieve a location of an entity associated the item, calculate an estimated arrival time when the vehicle will arrive at the location, compare the estimated arrival time with a predetermined time associated with the entity, and instruct the output device to generate a delivery prompt related to the item in response to comparing the estimated arrival time with the predetermined time. In response to the delivery prompt, the user may select a previous order or place a new order based on menu selections in order to complete the order of food for home delivery. Generating a hands free delivery prompt may provide alternative options of ordering the item and save time from having to find other options or other stores.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A virtual assistance system for a vehicle, the virtual assistance system comprising:
   an input device;
   an output device; and
   a controller programmed to:
      receive, through the input device, a request for an item from a user;
      retrieve a location of an entity associated with the item;
      calculate an estimated arrival time when the vehicle will arrive at the location;
      determine whether the estimated arrival time is after a first predetermined time associated with the entity;
      determine whether a current time is before a second predetermined time associated with the entity; and
      instruct the output device to generate a delivery prompt inquiring a delivery of the item of the entity in response to determining that the estimated arrival time is after the first predetermined time and that the current time is before the second predetermined time, wherein the first predetermined time is a closing time of the entity.

2. The virtual assistance system of claim 1, wherein the controller is programmed to:
   determine whether the estimated arrival time is within a threshold time period prior to the first predetermined time; and
   instruct the output device to generate the delivery prompt in response to determining that the estimated arrival time is within the threshold time period prior to the first predetermined time.

3. The virtual assistance system of claim 1, wherein the second predetermined time is a delivery cutoff time for the entity.

4. The virtual assistance system of claim 1, wherein:
   the output device is a speaker, and
   the controller is programmed to instruct the speaker to generate an audible delivery prompt.

5. The virtual assistance system of claim 1, wherein:
   the output device is a screen, and
   the controller is programmed to instruct the screen to generate a visual delivery prompt.

6. The virtual assistance system of claim 1, wherein the controller is programmed to:
   determine a place where the item is to be delivered; and
   include the place in the delivery prompt.

7. The virtual assistance system of claim 6, wherein the controller is programmed to determine the place based on calendar information for the user.

8. The virtual assistance system of claim 6, wherein the controller is programmed to determine the place based on a current destination of the vehicle.

9. The virtual assistance system of claim 1, wherein the controller is programmed to:
instruct the output device to display the location of the entity and one or more available options for the item.

10. The virtual assistance system of claim 8, wherein the one or more available options include a pick-up option or a delivery option.

11. A method for implementing a request from a user, the method comprising:
receiving, through an input device of a vehicle, a request for an item from the user;
retrieving, by a processor of the vehicle, a location of an entity associated with the item;
calculating, by the processor, an estimated arrival time when the vehicle arrives at the location;
determining whether the estimated arrival time is after a first predetermined time associated with the entity;
determining whether a current time is before a second predetermined time associated with the entity; and
instructing an output device of the vehicle to generate a delivery prompt inquiring a delivery of the item of the entity in response to determining that the estimated arrival time is after the first predetermined time and that the current time is before the second predetermined time associated with the entity, wherein the first predetermined time is a closing time of the entity.

12. The method of claim 11, further comprising:
determining whether the estimated arrival time is within a threshold time period prior to the first predetermined time; and
instructing the output device to generate the delivery prompt in response to determining that the estimated arrival time is within the threshold time period prior to the first predetermined time.

13. A virtual assistance system for a vehicle, the virtual assistance system comprising:
a microphone;
a speaker; and
a controller programmed to perform at least the following when executed by the one or more processors:
receive, through the microphone, a request for a food item from a user;
retrieve a location of a restaurant that serves the food item;
calculate an estimated arrival time when the vehicle arrives at the restaurant;
determine whether the estimated arrival time is after a closing time of the restaurant determine whether a current time is before a second predetermined time associated with the entity; and
instruct the speaker to generate a delivery prompt inquiring a delivery of the food item of the restaurant in response to determining that the estimated arrival time is after the closing time and that the current time is before the second predetermined time associated with the entity.

14. The virtual assistance system of claim 13, wherein the controller is programmed to:
determine whether the estimated arrival time is within a threshold time period prior to the closing time; and
instruct the speaker to generate the delivery prompt in response to determining that the estimated arrival time is within the threshold time period prior to the closing time.

* * * * *

UNITED STATES PATENT AND TRADEMARK OFFICE
CERTIFICATE OF CORRECTION

PATENT NO. : 11,250,845 B2
APPLICATION NO. : 16/122489
DATED : February 15, 2022
INVENTOR(S) : Brian M. Kursar It is certified that error appears in the above-identified patent and that said Letters Patent is hereby corrected as shown below:

In the Claims

Column 17, Line 11, Claim 10, delete "8" and insert --9--, therefor.

Signed and Sealed this
Twenty-sixth Day of April, 2022

Katherine Kelly Vidal
*Director of the United States Patent and Trademark Office*